United States Patent [19]

Hondzinski

[11] 3,848,540

[45] Nov. 19, 1974

[54] CONVEYOR ASSEMBLY

[75] Inventor: Leonard J. Hondzinski, Rochester, Mich.

[73] Assignee: Nuprin Corporation, Rochester, Mich.

[22] Filed: July 23, 1973

[21] Appl. No.: 381,379

[52] U.S. Cl. .................................. 104/155, 198/1
[51] Int. Cl. ............................................ B61b 13/00
[58] Field of Search ........ 104/154, 155, 158; 198/1, 198/129, 184

[56] References Cited
UNITED STATES PATENTS

| | | | |
|---|---|---|---|
| 3,014,459 | 12/1961 | Gustairs | 104/155 X |
| 3,534,690 | 10/1970 | Lockard | 104/155 |
| 3,687,083 | 8/1972 | Brown | 104/155 |
| 3,785,295 | 1/1974 | Kiukkonen | 104/155 |

Primary Examiner—Lloyd L. King
Assistant Examiner—Randolph A. Reese
Attorney, Agent, or Firm—McGlynn and Milton

[57] ABSTRACT

A conveyor assembly particularly suited for conveying automobiles. The conveying assembly includes an elongated support plate upon which is disposed a plurality of serially arranged non-stretchable conduits. Disposed within each conduit is a stretchable and expandable tube which expands within the conduit when fluid pressure is applied thereto to provide a conveying force to move the conveyed article along the conduit as the conduit expands. Disposed over the non-stretchable conduit is a flexible belt which engages the article to be conveyed. A flow regulator means is in fluid communication with each of the expandable tubes for providing an equal volume of fluid per unit of time to each of the tubes whereby conveyed articles are moved at the same speed along the conveyor regardless of their weight. The lead end of each conduit and tube is attached to a movable flap of the support means to allow the conduit to move in the direction in which the conveyed article is conveyed. Rectangular fluid pipes extend along the opposite sides of the support plate and are supported by cross beams which also support the support plate.

6 Claims, 5 Drawing Figures

PATENTED NOV 19 1974

CONVEYOR ASSEMBLY

This invention relates to a conveyor assembly of the type which is particularly well suited for conveying automobiles although it may be utilized for conveying various articles, but will be described herein in connection with the conveying of automotive vehicles.

The conveyor assembly of the subject invention is particularly well suited for use in automatic car wash systems where automobiles are serially moved through the various cleaning and drying stations in a car wash system.

A conveyor assembly of the type to which the instant invention pertains is set forth in U.S. Pat. No. 3,687,083. The instant invention represents an improvement in such a conveyor assembly.

In such a conveyor assembly the wheel of an automobile to be conveyed rests upon a conduit which is expanded by fluid pressure to engage the rear of the wheel to move the wheel along the conveying path as the conduit expands therealong. Of course, for the conveyor to be effective there must be a seal of the conduit immediately beneath the wheel so that the fluid pressure within the expanding conduit acts against the rear of the wheel. At the same time, the conduit must be of a sufficient size so that when expanded it will provide sufficient conveying force to move the automobile. Thus, there is a conflict between having a sufficiently large conduit and obtaining the desired seal in the conduit, because the larger the conduit the more difficult it is to seal. Accordingly, in accordance with the instant invention, there is provided within a non-stretchable but expandable conduit a smaller expandable and stretchable tubular member which is supplied the fluid pressure to expand into conformance with the interior of the non-stretchable conduit. In the non-expanded and collapsed, flattened position the inner tubular member is much smaller than the conduit and therefore the weight of the wheel of the vehicle being conveyed very effectively seals the smaller inner tube.

Other features and attendant advantages of the instant invention will be readily appreciated as the same becomes better understood by reference to the following detailed description when considered in connection with the accompanying drawings, wherein.

Figure 1:
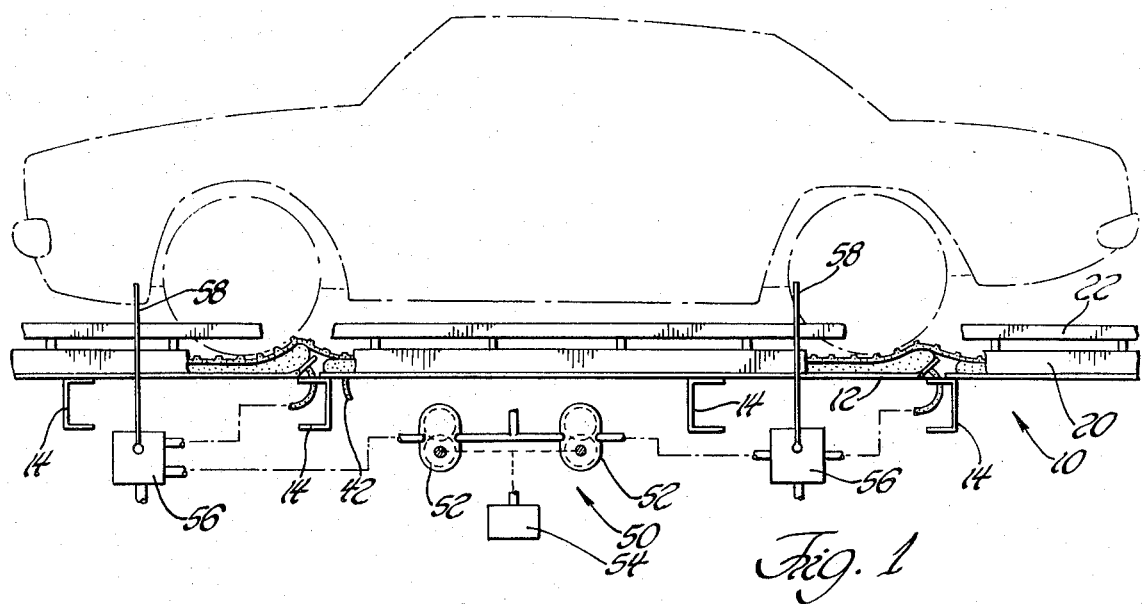
FIG. 1 is a side elevational view, partially broken away, showing a conveyor assembly constructed in accordance with the instant invention for conveying an automotive vehicle.

A conveyor assembly constructed in accordance with the instant invention is generally shown at 10.

The conveyor assembly 10 includes an elongated support means comprising a metal support plate 12 which is welded to and supported by transversely extending spaced beams 14. The beams 14 are channel members generally C-shaped in cross section.

Fluid pipe means comprising the first, second and third pipes 16, 18 and 20 respectively, extend along opposite sides of the support plate 12. The fluid pipes 16, 18 and 20 are welded to and are supported by the transversely extending beams 14. The pipes 16, 18 and 20 are generally rectangular in cross sectional configuration.

Additionally, rails 22 and 24 are disposed upon and extend along the first and second fluid pipes 16 and 18. More specifically, the rails 24 are supported upon the pipes 16 and 18 by spaced posts 26. The pipes 16 and 18 and the rails 22 and 24 guide the vehicle wheel along the conveyor path.

A plurality of sequentially arranged conduits 28 are disposed along and supported by the support plate 12. The conduits 28 are flexible but are non-stretchable. The conduits 28 may be made of a woven plastic, or the like and have a cross section which is endless, i.e., the outer periphery or interior of the conduit is endless.

Disposed within each conduit 28 is a flexible and expansible tube 30. The flexible and expandable tube 30 may be made of rubber or a similar expandable material. The tube 30 is stretchable so that it expands to conform to the endless interior of the conduit 28. A flexible belt 32 is disposed upon or rests upon the conduits 28.

Figure 2:
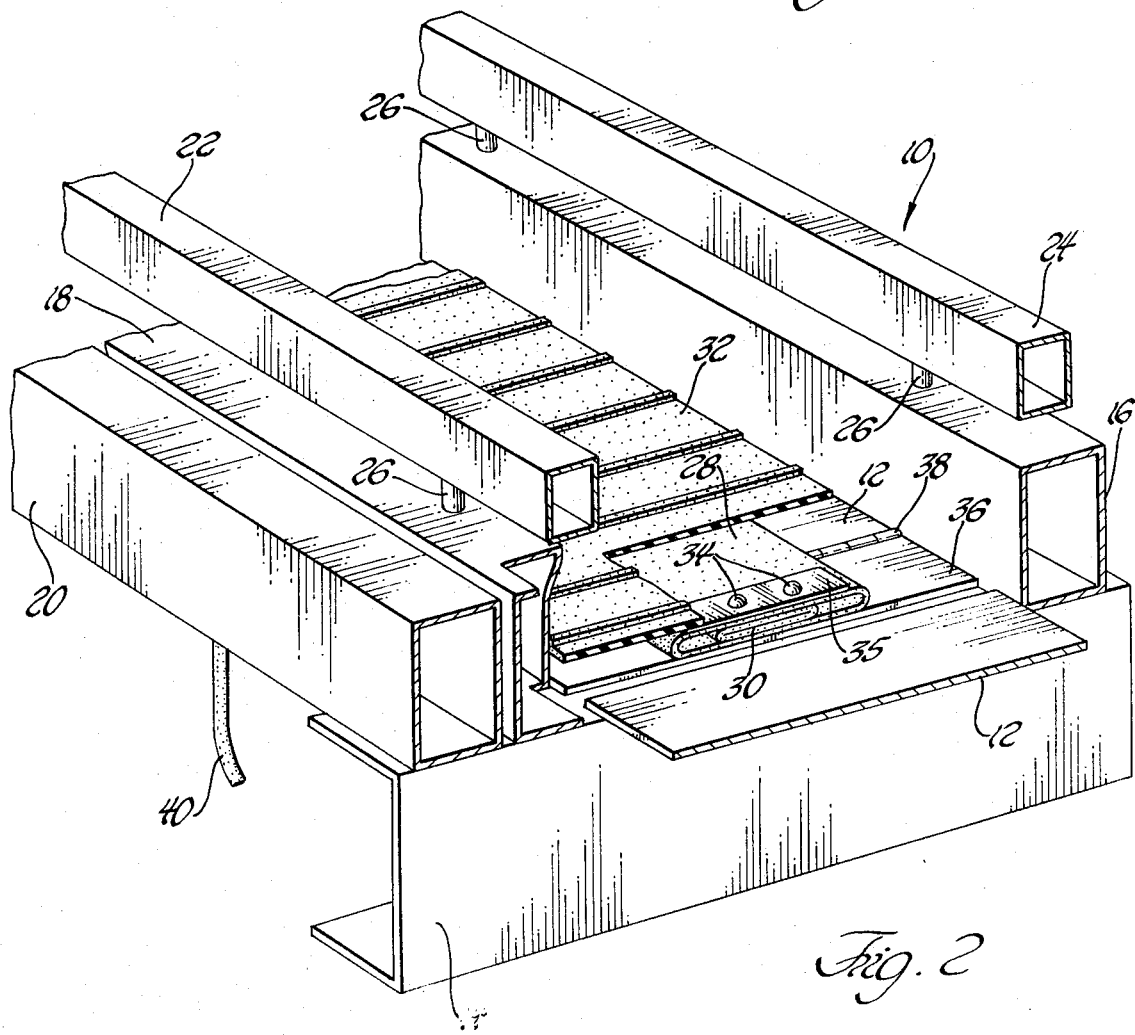
FIG. 2 is a fragmentary, perspective view, partially in cross section, showing the conveyor of the instant invention.

FIG. 2 shows the lead-in end of a conduit 28 and shows the conduit 28 and the inner flexible tube 30 to be sealed or closed by way of bolts 34 which extend through a clamping plate 35 and a hinged section 36 of the support plate, the section 36 being hinged to the remainder of the support plate 12 by way of the hinge 38. Each hinged flap or plate 36 rests upon a transversely extending beam 14 when the inner tube 30 is not inflated. A fluid inlet line 40 extends through the hinged member 36 and is in fluid communication with the inner tube 30 for inflating and expanding the inner flexible tube 30 into conformance with the conduit 28 which limits the expansion of the stretchable tube 30. The inlet conduit 40 may extend from the fluid pipe 18. The outward end of the conduit 28 is attached to the support plate 12 and sealed in a similar fashion to the lead-in end by the bolts 37.

Figure 3:
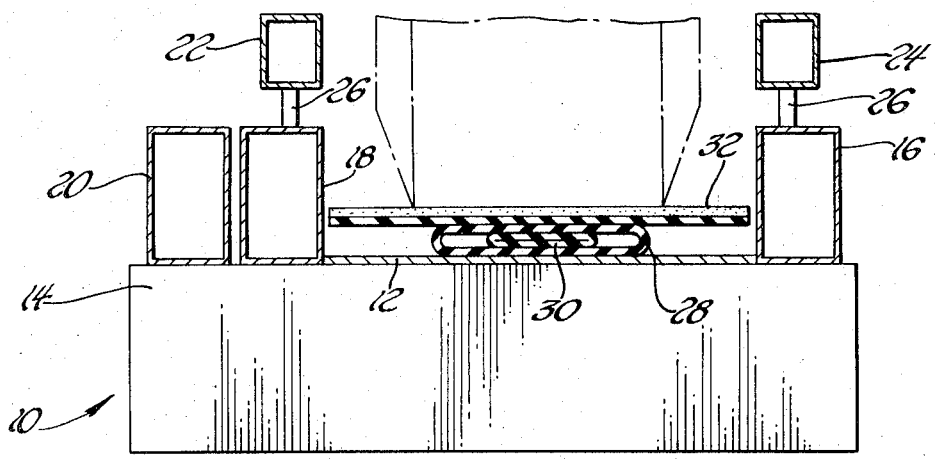
FIG. 3 is a cross sectional view of the conveyor assembly of the instant invention at a position directly beneath the wheel of a vehicle being conveyed.
Figure 4:
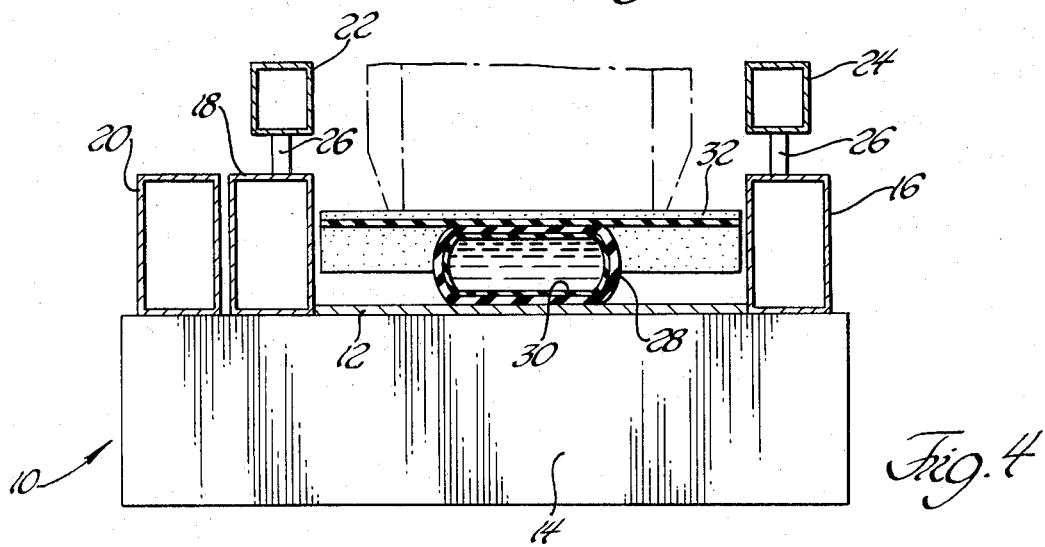
FIG. 4 is a view similar to FIG. 3 but showing a cross section rearwardly and immediately behind the wheel of a vehicle being conveyed.
Figure 5:
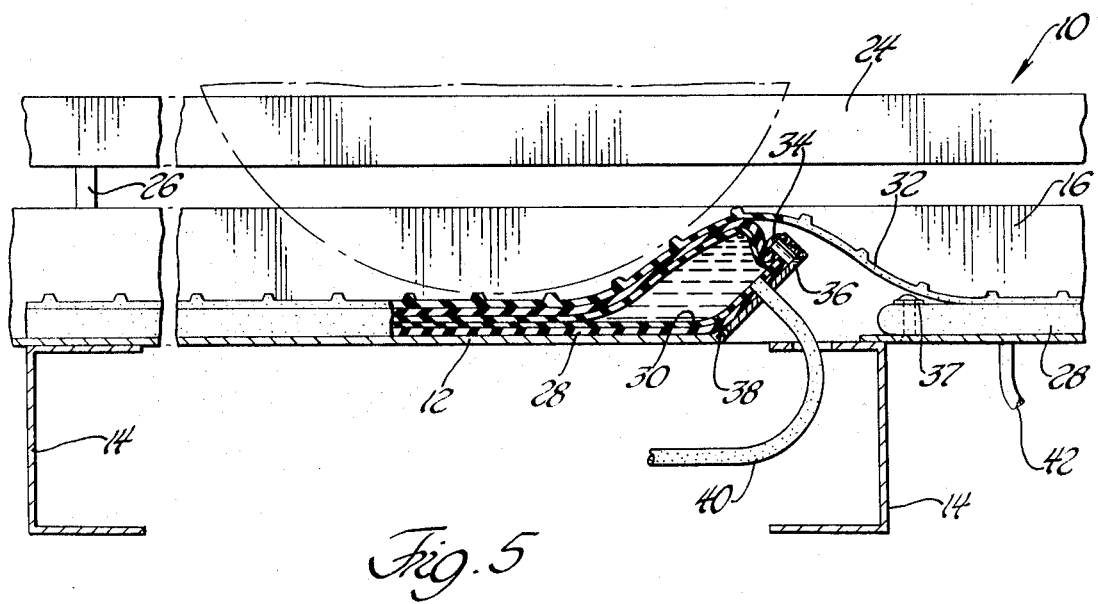
FIG. 5 is an enlarged side view, partially broken away and in cross section, of a portion of the conveyor assembly of the subject invention.

As best illustrated in FIGS. 2 and 3, the inner tube 30, when in the collapsed, unexpanded condition within the conduit, is smaller than the conduit 28. Preferably the conduit 28, when in the flattened position, is approximately 6 inches wide and the inner tubular member is approximately 3 inches wide and centered within the conduit 28. Thus, as best illustrated in FIG. 3, the expandable tube 30 is small and therefore the wheel of a vehicle being conveyed applies a force to the small tube 30, thereby effecting a very firm seal immediately beneath the vehicle wheel. It will be appreciated that a much more effective seal is maintained in the tube 30 than would be maintained in the much wider conduit 28, yet the inner tube 30 expands to conform with the conduit 28 to provide the required volume, as shown in FIG. 4. Fluid is supplied to the lead-in end of the tubular member 30 as shown in FIG. 5 to expand the conduit 28 along the conveyor immediately behind a vehicle wheel as the vehicle wheel moves along the conveyor. When the vehicle wheel reaches an end of a particular conduit, it moves to a next adjacent conduit and the preceding conduit collapses because the fluid flows out through an outlet 42 at the other end of the tube 30.

As mentioned hereinbefore, the lead-in end of the conduit 28 and tube 30 is secured by the bolts 34 to the hinged flap 36. The hinged flap 36, as best illustrated in FIG. 5, allows the conduit 28 and tube 30 to move in the direction of the conveyed article as the conduit is expanded whereby the conduit moves the belt 32 to a high position against the rear of the vehicle wheel to provide a more effective conveying force. The hinged flap or plate 36 may take other forms as, for example, a sliding plate, to allow the lead-in end of the conduit to move in the direction of the vehicle being conveyed to allow the conduit, and hence the flexible belt, to move high up upon the article being conveyed, such as the vehicle wheel illustrated.

As alluded to hereinbefore, the conveyor assembly includes a plurality of conduits 28 each of which contains an expansible tube 30. The conduits 28 are sequentially disposed along the conveying path and are each expandable in response to fluid pressure. As mentioned above, each conduit and tube 30 includes a fluid inlet means 40 and a fluid outlet means 42. The fluid pipes 18 and 20 are utilized to supply fluid to the inlets 40 and pipe 16 may be utilized for connection to outlets 42. One supply pipe 18 may be utilized for one speed of conveying and both pipes 16 and 18 may be utilized to double the volume and consequently double the conveying speed.

As best illustrated in FIG. 1, the assembly also includes a flow regulator means generally shown at 50 for supplying substantially equal volumes of fluid per unit of time to each of the fluid inlet means 40 whereby each of the inner tubes 30 of the conduits 28 are supplied equal volumes of fluid per predetermined period of time. Thus, the conveyed vehicles move at equal speeds along the conveyor regardless of their differences in weight. Various flow regulator means may be utilized, but as illustrated, each conduit is supplied fluid by a positive displacement, gear-type pump 52. Of course, the pumps 52 are all driven at the same speed to provide identical gallon-per-minute outputs. As illustrated schematically in FIG. 1, the gear pumps 52 are driven by a common motor 54.

Flow control valves 56 are included in the system to direct the outputs of the pump either to a sump or to various conduits. Each valve is controlled by a sensing means 58 which senses the position of the vehicle to position the valve so that the output of the respective pumps 52 pass to the inner tube 30 of a conduit 28 when the wheel of a vehicle is disposed upon the conduit in a position where it can be conveyed by the conduit.

Of course, the flow regulating means taking the form of a gear pump 52 may be varied so that at any given time a selected volume of fluid is moved to the conduits to control the speed at which the vehicles are moved along the conveyor. This may be accomplished by adjusting the speed at which the gear motors rotate by way of a transmission between the motor 54 and the pumps 52.

Instead of positive displacement pumps, such as the gear pumps 52, volumetric flow regulators may be utilized or volumetric flow dividers.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A conveyor assembly comprising; a conduit having a cross section which is endless, a flexible and expandable tube disposed within said conduit, said tube being smaller than said conduit in the unexpanded condition and being stretchable to expand to conform to the endless interior of said conduit, said conduit being nonstretchable for limiting the expansion of said tube.

2. An assembly as set forth in claim 1 including fluid inlet means in fluid communication with said tube for supplying fluid thereto to expand said tube.

3. An assembly as set forth in claim 2 wherein said tube is closed, said fluid inlet means being disposed at a first end thereof and including fluid outlet means at the second end thereof.

4. An assembly as set forth in claim 3 including a flexible belt disposed over said conduit.

5. An assembly as set forth in claim 4 wherein said conduit is narrower than said belt in the flattened and collapsed condition.

6. An assembly as set forth in claim 5 wherein said conduit is approximately twice the width of said tube when in the flattened and collapsed condition.

* * * * *